United States Patent
Chen

(10) Patent No.: US 9,999,007 B2
(45) Date of Patent: Jun. 12, 2018

(54) METHOD, DEVICE AND SYSTEM FOR POWER FOR REPORTING HEADROOM REPORT IN DUAL CONNECTIVITY

(71) Applicant: ZTE Corporation, Shenzhen, Guangdong (CN)

(72) Inventor: Zhongming Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days. days.

(21) Appl. No.: 15/327,850

(22) PCT Filed: Sep. 12, 2014

(86) PCT No.: PCT/CN2014/086437
§ 371 (c)(1),
(2) Date: Jan. 20, 2017

(87) PCT Pub. No.: WO2015/117311
PCT Pub. Date: Aug. 13, 2015

(65) Prior Publication Data
US 2017/0215156 A1    Jul. 27, 2017

(30) Foreign Application Priority Data
Jul. 22, 2014    (CN) .......................... 2014 1 0351336

(51) Int. Cl.
*H04B 7/00*    (2006.01)
*H04W 52/36*    (2009.01)
(Continued)

(52) U.S. Cl.
CPC ......... *H04W 52/365* (2013.01); *H04W 28/08* (2013.01); *H04W 52/40* (2013.01)

(58) Field of Classification Search
CPC .... H04W 52/365; H04W 52/40; H04W 28/08
See application file for complete search history.

(56) References Cited

U.S. PATENT DOCUMENTS

| | | | | |
|---|---|---|---|---|
| 6,021,125 A | * | 2/2000 | Sakoda | ................. H04W 36/30 370/345 |
| 9,603,098 B2 | * | 3/2017 | Ryoo | ................. H04W 76/046 |

(Continued)

FOREIGN PATENT DOCUMENTS

| | | |
|---|---|---|
| CN | 101895923 A | 11/2010 |
| CN | 102118786 A | 7/2011 |

(Continued)

OTHER PUBLICATIONS

Supplementary European Search Report in European application No. 14881802.4, dated May 29, 2017, 10 pgs.

(Continued)

*Primary Examiner* — Dominic Rego
(74) *Attorney, Agent, or Firm* — Cooper Legal Group, LLC

(57) ABSTRACT

The disclosure discloses a reporting method, device and system for a Power Headroom Report (PHR) in dual connectivity. A first Evolved Node B (eNB) and a second eNB establish split Data Radio Bearers (DRBs) with a User Equipment (UE), and transmit an indication for indicating change in uplink transmission to the UE; the UE determines the change in the uplink transmission of the split DRBs, and triggers and reports the PHR to the first eNB and/or the second eNB according to the change in the uplink transmission respectively; and the first eNB and/or the second eNB receive/receives the PHR reported by the UE respectively. The disclosure also discloses the reporting device and system for the PHR in the dual connectivity.

6 Claims, 6 Drawing Sheets

(51) Int. Cl.
*H04W 52/40* (2009.01)
*H04W 28/08* (2009.01)

(56) References Cited

U.S. PATENT DOCUMENTS

| | | | |
|---|---|---|---|
| 2010/0272046 A1 | 10/2010 | Guo | |
| 2012/0163248 A1* | 6/2012 | Chin | H04W 36/14 370/280 |
| 2013/0023272 A1* | 1/2013 | Watanabe | H04W 36/0083 455/438 |
| 2013/0165124 A1* | 6/2013 | Liang | H04W 36/0061 455/437 |
| 2013/0176953 A1 | 7/2013 | Stern-Berkowitz | |
| 2013/0225228 A1 | 8/2013 | Park | |
| 2014/0003392 A1* | 1/2014 | Yang | H04L 5/001 370/331 |
| 2014/0056278 A1 | 2/2014 | Marinier et al. | |
| 2014/0105180 A1* | 4/2014 | Grant | H04W 36/30 370/332 |
| 2014/0120920 A1* | 5/2014 | Park | H04W 56/00 455/437 |
| 2014/0192775 A1* | 7/2014 | Li | H04W 36/0072 370/331 |
| 2015/0215965 A1* | 7/2015 | Yamada | H04W 76/046 370/329 |
| 2015/0264562 A1* | 9/2015 | Wu | H04W 12/04 380/270 |
| 2017/0273095 A1* | 9/2017 | Heo | H04W 36/0055 |

FOREIGN PATENT DOCUMENTS

| | | |
|---|---|---|
| CN | 102215527 A | 10/2011 |
| CN | 102300249 A | 12/2011 |
| CN | 102573032 A | 7/2012 |
| CN | 102714535 A | 10/2012 |
| CN | 103190103 A | 7/2013 |
| CN | 103201973 A | 7/2013 |
| WO | 2013025562 A2 | 2/2013 |

OTHER PUBLICATIONS

"Considerations on power control for Dual Connectivity", Ericsson, Feb. 2014, 3GPP Draft; R2-140659 Considerations on Power Control for Dual Connectivity, 3rd Generation Partnership Project (3GPP),Mobile Competence Centre; 650, Route Des Luci0les; F-06921 Sophia-Antipolis CE, vol. RAN WG2, No. Prague, Czech Republic; Retrieved from the Internet: URL: http: //www.3gpp.org/ ftp/Meetings_3GPP_SYNC/RAN2 /Docs/, 4 pgs.

International Search Report in international application No. PCT/CN2014/086437, dated Apr. 29, 2015, 2 pgs.

English Translation of the Written Opinion of the International Search Authority in international application No. PCT/CN2014/086437, dated Apr. 29, 2015, 10 pgs.

\* cited by examiner

METHOD, DEVICE AND SYSTEM FOR POWER FOR REPORTING HEADROOM REPORT IN DUAL CONNECTIVITY

TECHNICAL FIELD

The disclosure relates to a dual connectivity technology for mobile communication, and particularly to a method, device and system for reporting a Power Headroom Report (PHR) in dual connectivity.

BACKGROUND

In a Long Term Evolution (LTE) system, current power transmitted by a User Equipment (UE) is not allowed to exceed maximum of power transmitted by the UE. The UE usually notifies an Evolved Node B (eNB) of a difference between the maximum of power transmitted by the UE and current transmitted power of an Uplink Shared Channel (UL-SCH) and a Physical Uplink Control Channel (PUCC) by a PHR reporting process. And the eNB performs uplink scheduling and link adaptation according to the difference, and further determines whether to perform power control (for example, to reduce the transmitted power or to increase the transmitted power, and a power magnitude required to be regulated) to meet a requirement that the current power transmitted by the UE is not allowed to exceed the maximum of power transmitted by the UE while an optimal receiving effect is achieved. The PHR reporting process is implemented by transmitting a Media Access Control (MAC) Control Element (CE) of a PHR to a network side by the UE. In a current technology, there exist the following conditions triggering the UE to report the PHR: change in a path loss exceeds a specified threshold, a timer for periodic reporting times out, a configuration of the PHR changes, a Secondary Cell (Scell) is activated, and power back-off caused by power control exceeds a specified threshold. A triggering and transmitting process for a PHR in the current technology, as shown in FIG. 1, includes the following steps.

In Step 101, UE is triggered to report the PHR.

There exist the following conditions triggering the UE to report the PHR: change in a path loss exceeds a specified threshold, a timer for periodic reporting times out, a configuration of the PHR changes, an SCell is activated, and power back-off caused by power control exceeds a specified threshold.

In Step 102, the UE receives authorization for an uplink transmitted by an eNB.

In Step 103, the UE reports the PHR to the eNB.

In Step 104, the eNB determines to perform power regulation on the UE according to the PHR.

In Step 105, the eNB transmits a notification message of power regulation to the UE.

In an LTE system, a process for establishing a call with the UE includes: a process of establishing a control-plane link and user-plane link between the UE and an eNB and a process of establishing a control-plane link and user-plane link between the eNB and a core network. After the process for establishing a call with the UE, control-plane data between the eNB and the core network is born by a connection established between the eNB and a Mobility Management Entity (MME) in the core network, and user-plane data between the eNB and the core network is born by an Evolved Universal Mobile Telecommunications System (UMTS) Terrestrial Radio Access Network (E-UTRAN) Radio Access Bearer (ERAB) established between the eNB and a Serving GateWay (SGW) in the core network; and user-plane data between the eNB and the UE is born by Data Radio Bearers (DRBs), each DRB being configured with an identifier, and control-plane data is born by Signalling Radio Bearer (SRB), each SRB being configured with an identifier.

Due to lack of spectrum resources and sharp increase of high-traffic services of mobile users, a requirement on adoption of a high frequency point, such as 3.5 GHz, for hotspot coverage becomes increasingly obvious, and adopting a low-power node to increase user throughput and enhance mobility performance becomes a new application scenario. However, at a high frequency point, a signal is attenuated more seriously, and a cell has a smaller coverage area, and does not belong to the same station with an existing cell, so that many corporations and operating companies tend to seek for new enhancement solutions, of which one is dual connectivity. Under dual connectivity, UE may keep connections with more than two network nodes at the same time, but a control-plane connection is a connection established with only one cell therein, such as a macro cell. Multiple network nodes of UE are multiple eNBs, and delays between the eNBs are nonnegligible. For example, a network node is a macro eNB, called a Macro eNB (MeNB), and another network node is a small eNB, called a Small eNB (SeNB). In order to conveniently manage and reduce scheduling delays, there exists a Primary Cell (Pcell) and an Scell on the MeNB, and there exists a Primary Secondary Cell (PScell) on the SeNB.

In dual connectivity, in order to better perform load balancing between eNBs and maximally optimize cell resources, split DRBs are introduced. In dual connectivity, there exists a split DRB and a non-split DRB. The non-split DRB may exist in an MeNB or an SeNB only, and there may be three types of DRBs, wherein a DRB only existing on an MeNB is called an MeNB bearer for short, a DRB only existing on an SeNB is called an SeNB bearer for short, and DRBs existing on both the MeNB and the SeNB are called split DRBs for short. Under a background that DRBs exist on both an MeNB and an SeNB, there is yet no technology disclosed for how to trigger reporting of a PHR.

SUMMARY

In order to solve the existing technical problem, an embodiment of the disclosure mainly provides a method, device and system for reporting a PHR in dual connectivity.

The technical solutions of the embodiments of the disclosure are implemented as follows.

The embodiments of the disclosure provide a method for reporting a PHR in dual connectivity, which may include: a UE establishes split DRBs, determines change in uplink transmission of the split DRBs, and triggers and reports the PHR according to the change in the uplink transmission.

The embodiments of the disclosure provide a method for reporting a PHR in dual connectivity, which may include: a first eNB and a second eNB establish split DRBs with UE, transmit an indication for indicating change in uplink transmission, and receive the PHRs reported by the UE respectively.

The embodiments of the disclosure provide a method for reporting a PHR in dual connectivity, which may include:

a first eNB and a second eNB establish split DRBs with UE, and transmit an indication for indicating change in uplink transmission to the UE;

the UE determines the change in the uplink transmission of the split DRBs, and triggers and reports the PHR to the first eNB and/or the second eNB according to the change in the uplink transmission; and the first eNB and/or the second eNB receive/receives the PHR reported by the UE.

The embodiments of the disclosure provide a device for reporting a PHR in dual connectivity, which may include: a first split bearer establishment module, a determination module and a reporting module, wherein the first split bearer establishment module may be arranged to establish split DRBs;

the determination module may be arranged to determine change in uplink transmission under the condition of the split DRBs, and notify the reporting module of change in uplink transmission; and the reporting module may be arranged to trigger and report the PHR according to the change in the uplink transmission.

The embodiment of the disclosure provides a device for reporting a PHR in dual connectivity, which may include: a second split bearer establishment module, a transmission module and a receiving module, wherein the second split bearer establishment module may be arranged to establish split DRBs with UE;

the transmission module may be arranged to transmit an indication for indicating change in uplink transmission to the UE; and the receiving module may be arranged to receive the PHR reported by the UE.

The embodiments of the disclosure provide a system for reporting a PHR in dual connectivity, which may include: UE, a first eNB a second eNB, wherein the UE may be arranged to establish split DRBs with the first eNB and the second eNB, determine change in uplink transmission and trigger and report the PHR according to the change in the uplink transmission; and the first eNB and the second eNB may be arranged to establish the split DRBs with the UE, the first eNB or the second eNB may transmit an indication for indicating the change in the uplink transmission, and the first eNB and/or the second eNB may receive the PHR reported by the UE.

The embodiments of the disclosure provide the method, device and system for reporting the PHR in the dual connectivity, and the first eNB and the second eNB establish the split DRBs with the UE, and transmit the indication for indicating the change in the uplink transmission to the UE; the UE determines the change in the uplink transmission of the split DRBs, and triggers and reports the PHR to the first eNB and/or the second eNB according to the change in the uplink transmission; and the first eNB and/or the second eNB receive/receives the PHR reported by the UE. In such a manner, a technical means for triggering reporting of the PHR under the condition of the split DRBs in the dual connectivity is provided for the UE, so that the UE may timely acquire uplink transmitted powers of the UE for the two eNBs to further perform power regulation for more reasonable scheduling in case of the change in the uplink transmission under the condition of the split DRBs.

DETAILED DESCRIPTION

In the embodiment of the disclosure, UE establishes split DRBs, determines change in uplink transmission of the split DRBs, and reports a PHR according to the change in the uplink transmission.

The disclosure will be further described below with reference to the drawings and specific embodiments in detail.

Figure 1:
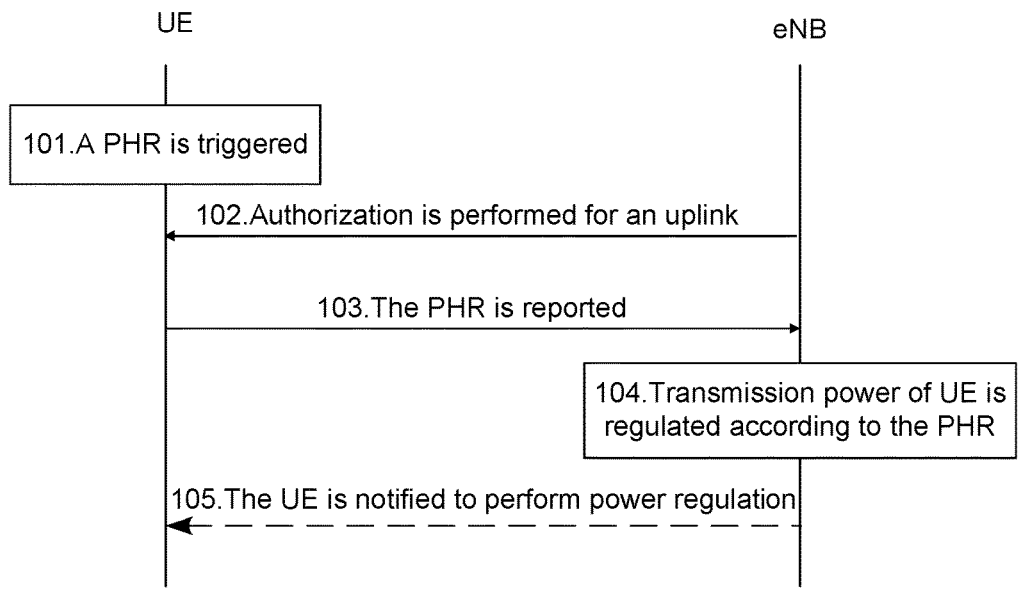
FIG. 1 is a schematic diagram of a triggering and transmitting process for PHR.
Figure 2:
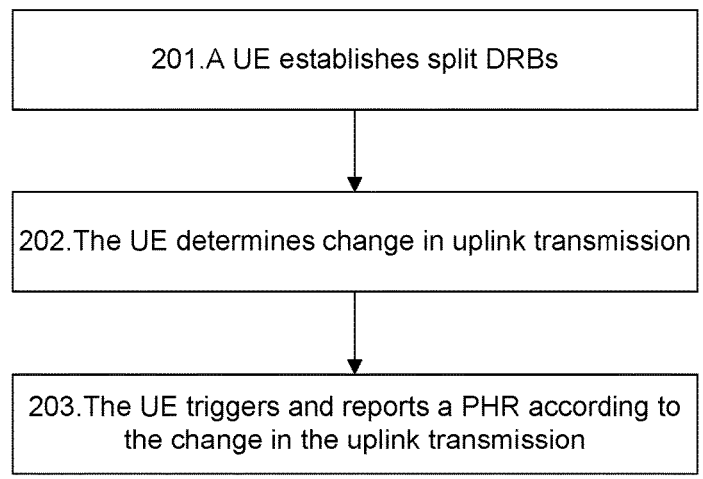
FIG. 2 is a first flowchart of a method for reporting a PHR in dual connectivity according to an embodiment of the disclosure.

The embodiment of the disclosure implements a method for reporting a PHR in dual connectivity, and as shown in FIG. 2, the method includes the following steps.

In Step 201, a UE establishes split DRBs.

Specifically, the UE establishes DRBs with the same identifier with a first eNB and a second eNB to make the DRB exist on both the first eNB and the second eNB to form the split DRBs. Here, the first eNB and the second eNB represent two different eNBs. Generally, one eNB is an MeNB and the other is an SeNB.

The step that the UE establishes the DRBs with the same identifier with the first eNB and the second eNB includes: the UE establishes data connections with a cell of the first eNB and a cell of the second eNB respectively.

In Step 202, the UE determines change in uplink transmission.

In the step, the change in the uplink transmission is determined in any one of the following manners.

In a first manner, the UE receives uplink transmission switching indication information transmitted by the first eNB or the second eNB, and determines to switch uplink transmission from the first eNB to the second eNB or from the second eNB to the first eNB according to the uplink transmission switching indication information. In case of switching from the first eNB to the second eNB, the first eNB transmits a request to the second eNB for changing a bearer, and after receiving an agreement of the second eNB, notifies the UE of stopping performing uplink data transmission through the first eNB and starting performing uplink data transmission through the second eNB. The uplink transmission switching indication information is arranged to indicate whether to switch uplink transmission from the first eNB to the second eNB or from the second eNB to the first eNB, and may be an indicator bit or an independent cell.

In a second manner, the UE receives a cell deletion command transmitted by the first eNB or the second eNB, deletes a corresponding cell according to the cell deletion command, and switches uplink transmission from the deleted cell to another cell.

In a third manner, the UE receives a cell addition command transmitted by the first eNB or the second eNB, adds a corresponding cell according to the cell addition command, and expands the uplink transmission to the added cell, that is, uplink data transmission is performed on an original cell and the added cell at the same time.

In a fourth manner, the UE receives a cell deletion command and cell addition command transmitted by the first eNB or the second eNB, deletes a corresponding cell according to the cell deletion command, adds a corresponding cell according to the cell addition command, and switches uplink transmission from the deleted cell to the added cell.

In Step 203, the UE triggers and reports the PHR according to the change in the uplink transmission.

Specifically, after receiving authorization for an uplink transmitted by the first eNB and the second eNB, the UE transmits the PHR to the first eNB and/or the second eNB according to the change in the uplink transmission.

Figure 3:
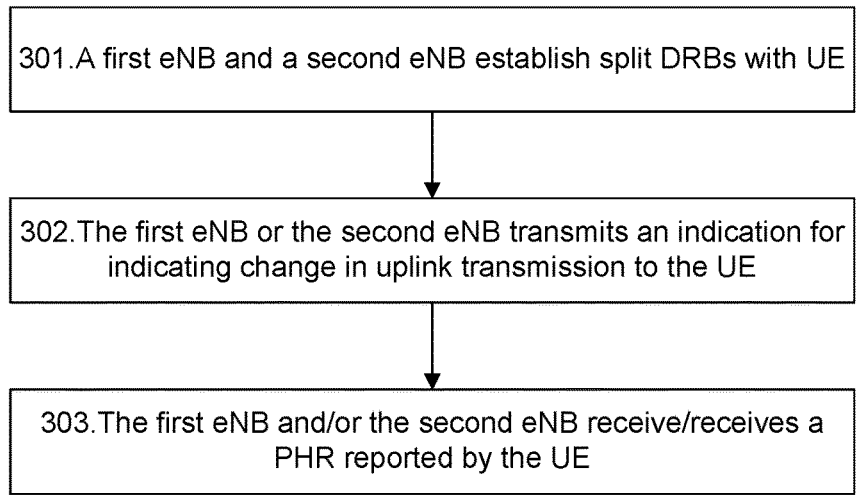
FIG. 3 is a second flowchart of a method for reporting a PHR in dual connectivity according to an embodiment of the disclosure.

Corresponding to the abovementioned method, the disclosure also provides another method for reporting a PHR in dual connectivity. As shown in FIG. 3, the method includes the following steps.

In Step 301, a first eNB and a second eNB establish split DRBs with UE.

In Step 302, the first eNB or the second eNB transmits an indication for indicating change in uplink transmission to the UE.

Specifically, the first eNB or the second eNB transmits uplink transmission switching indication information to the UE, and the uplink transmission switching indication information is arranged to indicate whether to switch uplink transmission from the first eNB to the second eNB or from the second eNB to the first eNB, and may be an indicator bit or an independent cell.

Alternatively, the first eNB or the second eNB transmits a cell deletion command to the UE.

Alternatively, the first eNB or the second eNB transmits a cell addition command to the UE.

Alternatively, the first eNB or the second eNB transmits a cell deletion command and a cell addition command to the UE.

In Step 303, the first eNB and/or the second eNB receive/receives the PHR reported by the UE.

Figure 4:
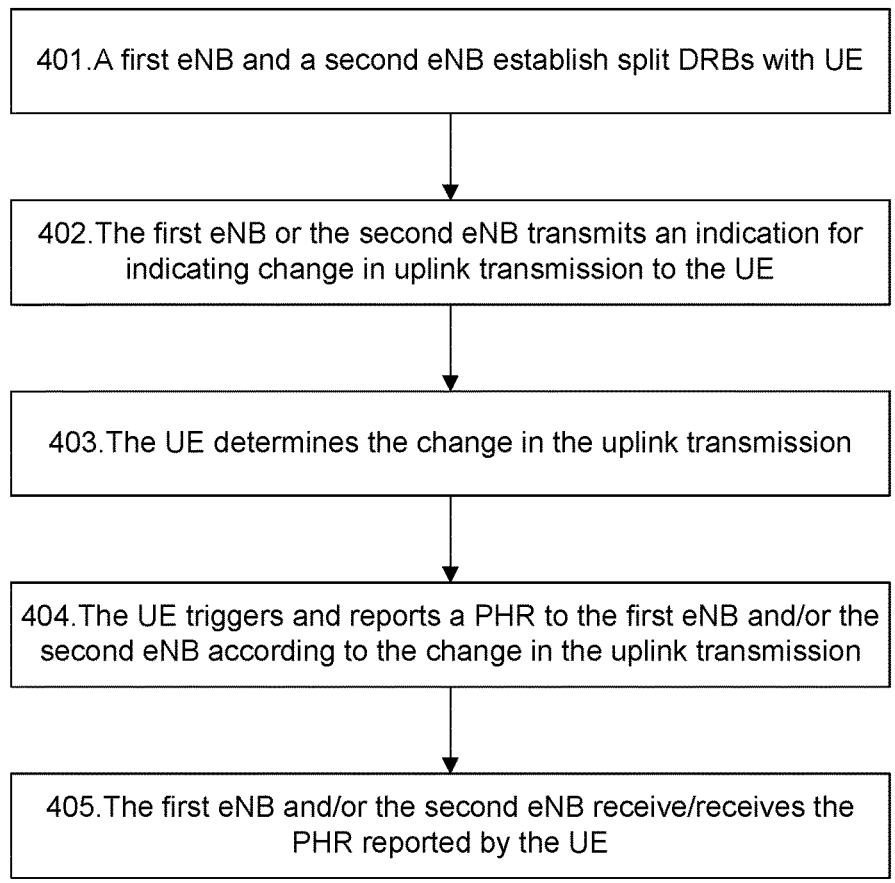
FIG. 4 is a third flowchart of a method for reporting a PHR in dual connectivity according to an embodiment of the disclosure.

The disclosure also provides a method for reporting a PHR in dual connectivity. As shown in FIG. 4, the method includes the following steps.

In Step 401, a first eNB and a second eNB establish split DRBs with UE.

Specifically, the UE establishes DRBs with the same identifier with the first eNB and the second eNB to make the DRBs exist on both the first eNB and the second eNB to form the split DRBs.

In Step 402, the first eNB or the second eNB transmits an indication for indicating change in uplink transmission to the UE.

Specifically, the first eNB or the second eNB transmits uplink transmission switching indication information to the UE, and the uplink transmission switching indication information is arranged to indicate whether to switch uplink transmission from the first eNB to the second eNB or from the second eNB to the first eNB, and may be an indicator bit or an independent cell.

Alternatively, the first eNB or the second eNB transmits a cell deletion command to the UE.

Alternatively, the first eNB or the second eNB transmits a cell addition command to the UE.

Alternatively, the first eNB or the second eNB transmits a cell deletion command and a cell addition command to the UE.

In Step 403, the UE determines the change in the uplink transmission.

In the step, determination of the change in the uplink transmission includes any one of the following conditions.

In a first manner, the UE receives the uplink transmission switching indication information transmitted by the first eNB or the second eNB, and determines to switch uplink transmission from the first eNB to the second eNB or from the second eNB to the first eNB according to the uplink transmission switching indication information. The uplink transmission switching indication information is arranged to indicate whether to switch the uplink transmission from the first eNB to the second eNB or from the second eNB to the first eNB, and may be an indicator bit or an independent cell.

In a second manner, the UE receives the cell deletion command transmitted by the first eNB or the second eNB, deletes a corresponding cell according to the cell deletion command, and switches the uplink transmission from the deleted cell to another cell.

In a third manner, the UE receives the cell addition command transmitted by the first eNB or the second eNB, adds a corresponding cell according to the cell addition command, and expands uplink transmission to the added cell, that is, uplink data transmissions are performed on an original cell and the added cell at the same time.

In a fourth manner, the UE receives the cell deletion command and cell addition command transmitted by the first eNB or the second eNB, deletes a corresponding cell according to the cell deletion command, adds a corresponding cell according to the cell addition command, and switches uplink transmission from the deleted cell to the added cell.

In Step 404, the UE triggers and reports the PHR to the first eNB and/or the second eNB according to the change in the uplink transmission.

In Step 405, the first eNB and/or the second eNB receive/receives the PHR reported by the UE.

Figure 5:
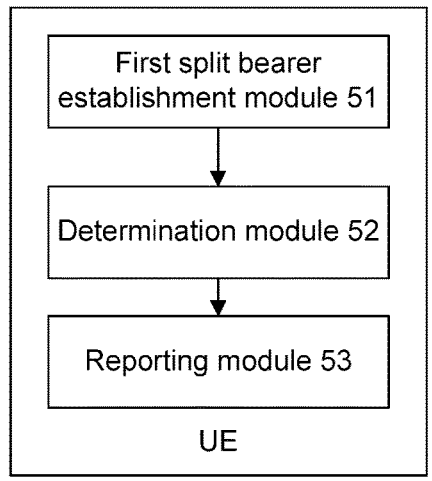
FIG. 5 is a first structure diagram of a device for reporting a PHR in dual connectivity according to an embodiment of the disclosure.

In order to implement the abovementioned method, the disclosure also provides a device for reporting a PHR in dual connectivity. The device is provided in UE. As shown in FIG. 5, the device includes a first split bearer establishment module 51, a determination module 52 and a reporting module 53.

The first split bearer establishment module 51 may be implemented by a wireless communication chip of the UE, and is arranged to establish split DRBs.

The determination module 52 may be implemented by a processor of the UE, and is arranged to determine change in uplink transmission under the condition of the split DRBs, and notify the reporting module 53 of the change in the uplink transmission.

The reporting module 53 may be implemented by a wireless communication interface, and is arranged to trigger and report the PHR according to the change in the uplink transmission.

Specifically, the first split bearer establishment module 51 establishes the same DRBs with a first eNB and a second eNB to make the DRBs exist on both the first eNB and the second eNB to form the split DRB. Here, the first eNB and the second eNB represent two different eNBs. Generally, one eNB is an MeNB and the other is an SeNB.

Determination on the change in the uplink transmission by the determination module 52 includes any one of the following conditions.

In a first condition, the determination module 52 receives the uplink transmission switching indication information transmitted by the first eNB or the second eNB, and determines to switch uplink transmission from the first eNB to the second eNB or from the second eNB to the first eNB according to the uplink transmission switching indication information. The uplink transmission switching indication information is arranged to indicate whether to switch the uplink transmission from the first eNB to the second eNB or from the second eNB to the first eNB. The uplink transmission switching indication information may be an indicator bit or an independent cell.

In a second condition, the determination module 52 receives a cell deletion command transmitted by the first eNB or the second eNB, deletes a corresponding cell according to the cell deletion command, and switches the uplink transmission from the deleted cell to another cell.

In a third condition, the determination module 52 receives a cell addition command transmitted by the first eNB or the second eNB, adds a corresponding cell according to the cell addition command, and expands the uplink transmission to the added cell.

In a fourth condition, the determination module 52 receives a cell deletion command and cell addition command transmitted by the first eNB or the second eNB, deletes a corresponding cell according to the cell deletion command, and adds a corresponding cell according to the cell addition command and switches the uplink transmission from the deleted cell to the added cell.

Figure 6:
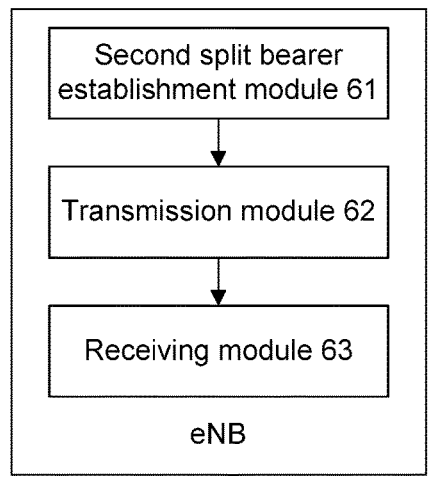
FIG. 6 is a second structure diagram of a device for reporting a PHR in dual connectivity according to an embodiment of the disclosure.

The disclosure provides another device for reporting a PHR in dual connectivity. The device is arranged in a first eNB and a second eNB. As shown in FIG. 6, the device includes a second split bearer establishment module 61, a transmission module 62 and a receiving module 63.

The second split bearer establishment module 61 may be implemented by a wireless communication chip, and is arranged to establish split DRBs with UE.

The transmission module 62 may be implemented by a transmission interface, and is arranged to transmit an indication for indicating change in uplink transmission to the UE.

Specifically, the transmission module 62 transmits uplink transmission switching indication information to the UE, and the uplink transmission switching indication information is arranged to indicate whether to switch uplink transmission from the first eNB to the second eNB or from the second eNB to the first eNB, and may be an indicator bit or an independent cell.

Alternatively, the transmission module 62 transmits a command to the UE for deleting a cell.

Alternatively, the transmission module 62 transmits a command to the UE for adding a cell.

Alternatively, the transmission module 62 transmits a command for deleting a cell and a command for adding a cell to the UE.

The receiving module 63 may be implemented by a receiving interface, and is arranged to receive the PHR reported by the UE.

Figure 7:
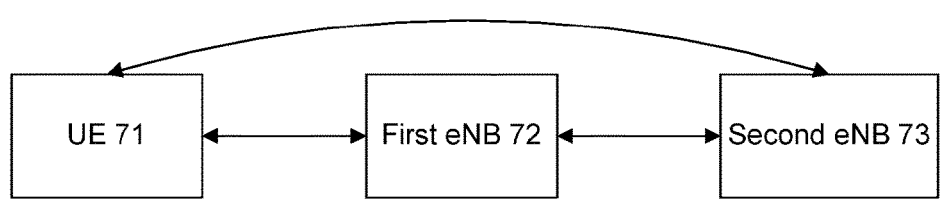
FIG. 7 is a structure diagram of a system for reporting a PHR in dual connectivity according to an embodiment of the disclosure.

The disclosure also provides a system for reporting a PHR in dual connectivity. As shown in FIG. 7, the system includes UE 71, a first eNB 72 and a second eNB 73.

The UE 71 is arranged to establish split DRBs with the first eNB 72 and the second eNB 73, determine change in uplink transmission, and trigger and report the PHR according to the change in the uplink transmission.

The first eNB 72 and the second eNB 73 are arranged to establish the split DRBs with the UE, the first eNB 72 or the second eNB 73 transmits an indication for indicating the change in the uplink transmission to the UE, and the first eNB 72 and/or the second eNB 73 receive/receives the PHR reported by the UE.

Specifically, the first eNB 72 or the second eNB 73 transmits uplink transmission switching indication information to the UE. The uplink transmission switching indication information is arranged to indicate whether to switch the uplink transmission from the first eNB 72 to the second eNB 73 or from the second eNB 73 to the first eNB 72. The uplink transmission switching indication information may be an indicator bit or an independent cell.

Alternatively, the first eNB 72 or the second eNB 73 transmits a cell deletion command to the UE.

Alternatively, the first eNB 72 or the second eNB 73 transmits a cell addition command to the UE.

Alternatively, the first eNB 72 or the second eNB 73 transmits a cell deletion command and a cell addition command to the UE.

Determination of the change in the uplink transmission by the UE 71 includes any one of the following conditions.

In a first condition, the UE 71 receives the uplink transmission switching indication information transmitted by the first eNB 72 or the second eNB 73, and determines to switch the uplink transmission from the first eNB 72 to the second eNB 73 or from the second eNB 73 and the first eNB 72 according to the uplink transmission switching indication information. The uplink transmission switching indication information is arranged to indicate whether to switch the uplink transmission from the first eNB 72 to the second eNB 73 or from the second eNB 73 to the first eNB 72. The uplink transmission switching indication information may be an indicator bit or an independent cell.

In a second condition, the UE 71 receives the cell deletion command transmitted by the first eNB 72 or the second eNB 73, deletes a corresponding cell according to the cell deletion command, and switches the uplink transmission from the deleted cell to another cell.

In a third condition, the UE 71 receives the cell addition command transmitted by the first eNB 72 or the second eNB 73, adds a corresponding cell according to the cell addition command, and expands the uplink transmission to the added cell, that is, uplink data transmission is performed on an original cell and the added cell at the same time.

In a fourth condition, the UE 71 receives the cell deletion command and cell addition command transmitted by the first eNB 72 or the second eNB 73, deletes a corresponding cell according to the cell deletion command, adds a corresponding cell according to the cell addition command, and switches the uplink transmission from the deleted cell to the added cell.

For better understanding the disclosure, the disclosure will be further described below with reference to specific embodiments.

Embodiment 1

Figure 8:
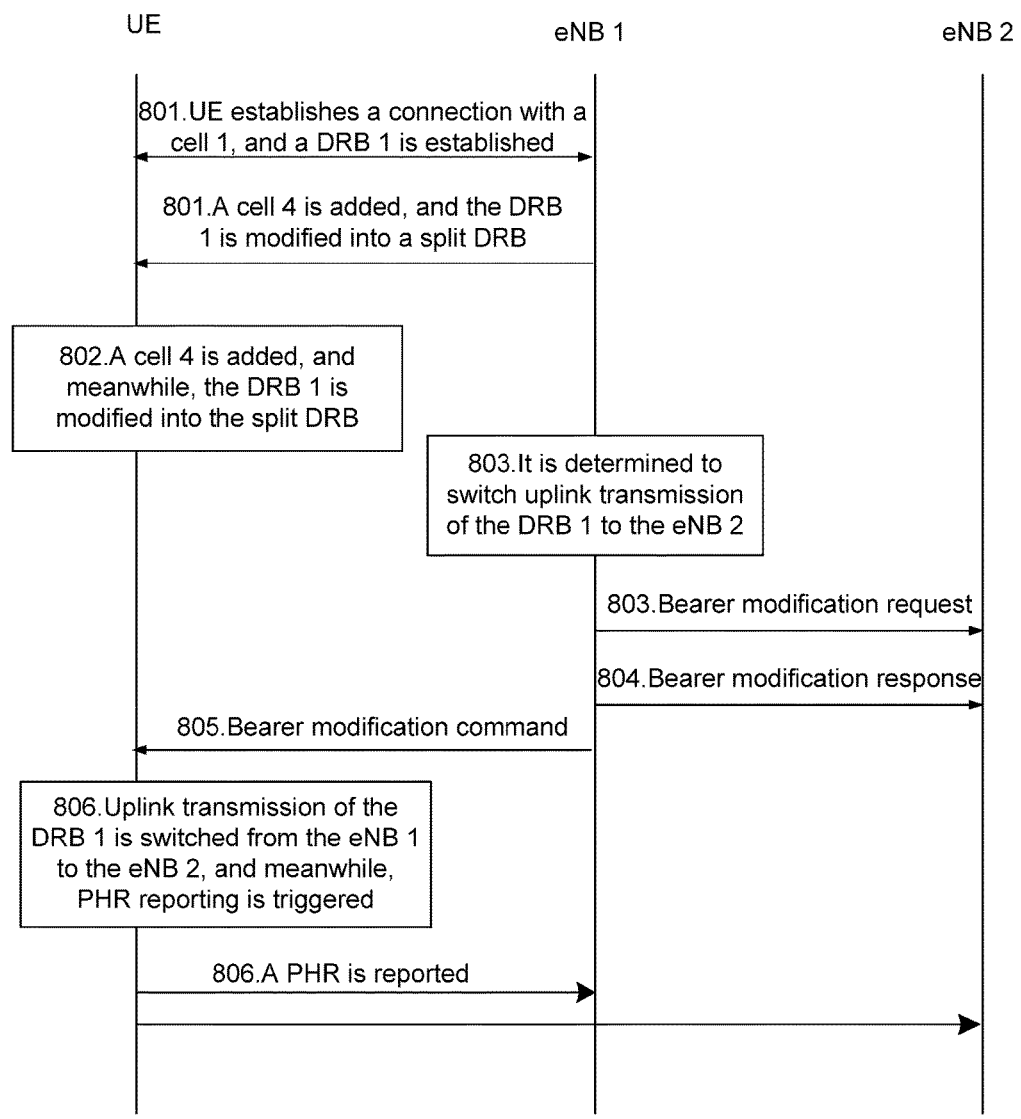
FIG. 8 is a flowchart of a method for reporting a PHR in dual connectivity according to embodiment 1 of the disclosure.

In the embodiment, UE establishes a connection with a cell 1, the cell 1 is a Pcell, a DRB 1 is established, only exists on an eNB 1, and is an MeNB bearer, and uplink and downlink transmissions both are implemented through an MeNB, namely through the cell 1. A method for reporting a PHR in dual connectivity, as shown in FIG. 8, includes the following steps.

In Step 801, with increase of traffic, the eNB 1 adds a cell 4 of an eNB 2 to the UE according to a measurement report, namely transmitting configuration information of the cell 4 to the UE. The cell 4 is a PScell. At the same time, the DRB 1 is modified to a split DRB, that is, the DRB 1 exists on both the eNB 1 and the eNB 2, and the uplink transmission is implemented through the eNB 1.

In Step 802, the UE receives the configuration information of the cell 4, adds the cell 4, and modifies the DRB 1 into the split DRB.

In Step 803, when there are insufficient uplink resources on the cell 1, the eNB 1 determines to switch the uplink transmission on the DRB 1 to the eNB 2, and transmits to the eNB 2 a request for modifying the bearer. The request may contain related configuration information, such as uplink configuration information, of the DRB 1 on the eNB 1.

In Step 804, the eNB 2 receives the request for modifying the bearer, reserves a resource for the DRB 1, and returns a bearer modification response to the eNB 1 to agree to modification. The response may contain related configuration information of the DRB 1 on the eNB 2.

In Step 805, the eNB 1 receives the bearer modification response of the eNB 2, and transmits a bearer modification command to the UE. The bearer modification command includes uplink transmission switching indication information arranged to indicate the uplink transmission of the DRB 1 to be switched from the eNB 1 to the eNB 2. The uplink transmission switching indication information may be an indicator bit, or an independent cell in a related configuration of the DRB 1 on the eNB 2.

In Step 806, the UE receives the uplink transmission switching indication information, switches the uplink transmission of the DRB 1 from the eNB 1 to the eNB 2, simultaneously triggers PHR reporting to the eNB 1 and the eNB 2, and transmits a PHR of a currently activated cell, such as the cell 1 and the cell 4, to the eNB 1 and the eNB 2 in a subsequent authorization for an uplink.

In the embodiment, after Step 806, when the uplink transmission of the DRB 1 is switched from the eNB 2 to the eNB 1, PHR reporting to the eNB 1 and the eNB 2 is also triggered.

Embodiment 2

Figure 9:
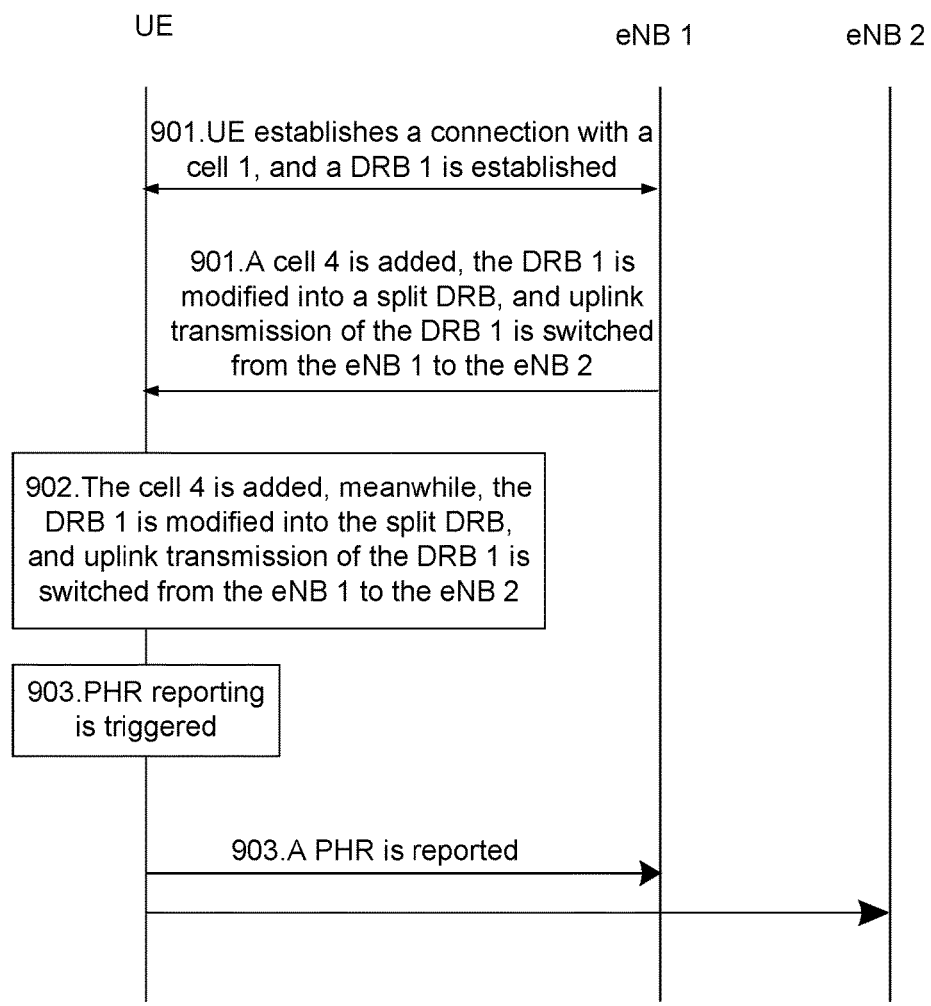
FIG. 9 is a flowchart of a method for reporting a PHR in dual connectivity according to embodiment 2 of the disclosure.

UE establishes a connection with a cell 1 which is a Pcell, and a DRB 1 is established. The DRB 1 only exists on an eNB 1, and is an MeNB bearer. Uplink and downlink transmissions both are implemented through the cell 1 on an MeNB. A method for reporting a PHR in dual connectivity, as shown in FIG. 9, includes the following steps.

In Step 901, with increase of traffic, the eNB 1 adds a cell 4 of an eNB 2 to the UE according to a measurement report, namely transmitting configuration information of the cell 4 to the UE which is a PScell. At the same time, the DRB 1 is amended into a split DRB, that is, the DRB 1 exists on both the eNB 1 and the eNB 2. Moreover, due to insufficient uplink resources of the cell 1, the eNB 1 switches uplink transmission of the DRB 1 to the eNB 2 by transmitting an indicator bit or an independent cell in a related configuration of the DRB 1 on the eNB 2 to the UE as uplink transmission switching indication information.

In Step 902, the UE receives the configuration information of the cell 4, adds the cell 4, modifies the DRB 1 into the split DRB, and switches the uplink transmission of the DRB 1 from the eNB 1 to the eNB 2.

In Step 903, the UE finds that the uplink transmission of the DRB 1 is switched from the eNB 1 to the eNB 2, then triggers PHR reporting to the eNB 1 and the eNB 2, and transmits a PHR of a current activated cell, such as the cell 1 and the cell 4, to the eNB 1 and the eNB 2 in a subsequent authorization for an uplink.

In the embodiment, if the DRB 1 is changed to be established on the eNB 2, i.e. an SeNB, uplink and downlink transmissions both are implemented through the cell 4 on the SeNB, and a process of modifying the DRB 1 into the split DRB and switching uplink transmission from the eNB 2 to the eNB 1 is similar to the abovementioned step, and will not be repeatedly described.

In Step 903, since the eNB 2 is a new node to which the uplink data is transmitted, the UE may only trigger PHR reporting to the eNB 2 and transmit the PHR of the current activated cell, such as the cell 1 and the cell 4, to the eNB 2 in the subsequent authorization for an uplink.

Embodiment 3

Figure 10:
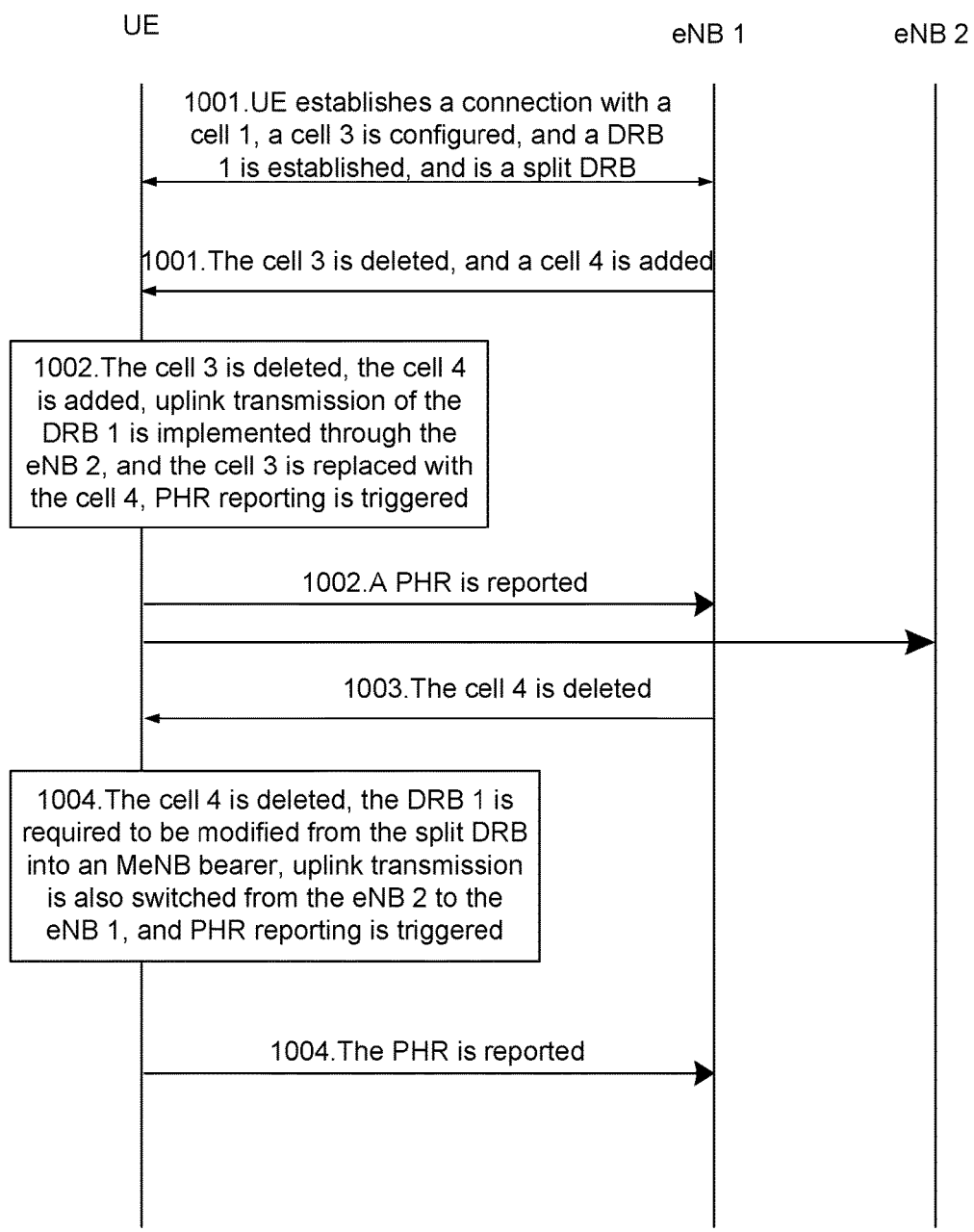
FIG. 10 is a flowchart of a method for reporting a PHR in dual connectivity according to embodiment 3 of the disclosure.

UE establishes a connection with a cell 1 which is a Pcell. In addition, a cell 3 of an eNB 2 is added, and a DRB 1 is established, and the DRB 1 exists on both an eNB 1 and the eNB 2, and is a split DRB. Uplink transmission is implemented through the eNB 2. A method for reporting a PHR in dual connectivity, as shown in FIG. 10, includes the following steps.

In Step 1001, the eNB 1 finds, according to a measurement report, that signal quality of the cell 3 of the eNB 2 becomes poorer and signal quality of a cell 4 of the eNB 2 becomes better, and the eNB 1 determines to delete the cell 3 and add the cell 4.

In Step 1002, the UE receives a deletion command for the cell 3 and an addition command for the cell 4, deletes the cell 3, adds the cell 4. PHR reporting to the eNB 2 is triggered because the uplink transmission of the DRB 1 is implemented through the eNB 2 and the cell 3 is replaced with the cell 4. A PHR of a current activated cell, such as the cell 1 and the cell 4, is transmitted to the eNB 2 in a subsequent authorization for an uplink.

In Step 1003, the eNB 1 acquires that the signal quality of the cell 4 becomes poorer according to a measurement report, and the eNB 1 determines to delete the cell 4, and transmits a deletion command for the cell 4 to the UE.

In Step 1004, the UE receives the deletion command for the cell 4, executes deletion of the cell 4, PHR reporting to the eNB 1 is triggered because the DRB 1 is modified from the split DRB into an MeNB bearer and uplink transmission is also switched from the eNB 2 to the eNB 1. The PHR of the current activated cell, such as the cell 1, is transmitted to the eNB 1 in the subsequent authorization for an uplink.

In Step 1002, if the cell 4 is directly added without deleting the cell 3, carrier aggregation of the cell 3 and the cell 4 is formed on the eNB 2. At this moment, because the uplink transmission is switched from the cell 3 to the cell 3 plus the cell 4 to make a change happen, PHR reporting to the eNB 2 is also triggered. Under the condition that both the cell 3 and the cell 4 are used, if the cell 4 is deleted, uplink transmission also changes, so that PHR reporting to the eNB 2 is also triggered.

After implementation of the embodiment, the uplink transmission of the DRB 1 is implemented through the MeNB, and when a cell on the MeNB changes, PHR reporting to the eNB 2 is also correspondingly triggered.

The above is only the preferred embodiment of the disclosure and not intended to limit the scope of protection of the disclosure. Any modifications, equivalent replacements, improvements and the like made within the spirit and principle of the disclosure shall fall within the scope of protection of the disclosure.

INDUSTRIAL APPLICABILITY

From each of the abovementioned embodiments of the disclosure, a technical means for triggering reporting of the PHR under the condition of the split DRB in the dual connectivity is provided for the UE, so that the eNBs may timely acquire the uplink transmitted power of the UE on the two eNBs to further perform power regulation for more reasonable scheduling in case of the change in the uplink transmission under the condition of the split DRB.

What is claimed is:

1. A reporting method for reporting a Power Headroom Report (PHR) in dual connectivity, comprising:
    establishing, by a User Equipment (UE), split Data Radio Bearers (DRBs), determining change in uplink transmission of the split DRBs, and triggering and reporting the PHR according to the change in the uplink transmission,
    wherein determining the change in the uplink transmission of the split DRBs comprises:
        a first manner: receiving, by the UE, uplink transmission switching indication information transmitted by a first Evolved Node B (eNB) or a second eNB, and determining to switch the uplink transmission from the first eNB to the second eNB or from the second eNB to the first eNB according to the uplink transmission switching indication information;
        or, a second manner: receiving, by the UE, a cell deletion command transmitted by the first eNB or the second eNB, deleting a corresponding cell according to the cell deletion command, and switching the uplink transmission from the deleted cell to another cell;
        or, a third manner: receiving, by the UE, a cell addition command transmitted by the first eNB or the second eNB, adding a corresponding cell according to the cell addition command, and expanding the uplink transmission to the added cell;
        or, a fourth manner: receiving, by the UE, a cell deletion command and a cell addition command transmitted by the first eNB or the second eNB, deleting a corresponding cell according to the cell deletion command, adding a corresponding cell according to the cell addition command, and switching the uplink transmission from the deleted cell to the added cell.

2. The reporting method according to claim 1, wherein establishing, by the UE, the split DRBs comprises: establishing, by the UE, DRBs with a same identifier with the first eNB and the second eNB to make the DRBs exist on both the first eNB and the second eNB to form the split DRBs.

3. A report method for reporting a Power Headroom Report (PHR) in dual connectivity, comprising:
    establishing, by a first Evolved Node B (eNB) and a second eNB, split Data Radio Bearers (DRBs) with a User Equipment (UE), transmitting an indication for indicating change in uplink transmission, and receiving the PHR reported by the UE,
    wherein transmitting the indication for indicating the change in the uplink transmission comprises:
        transmitting, by the first eNB or the second eNB, uplink transmission switching indication information to the UE, the uplink transmission switching indication information being arranged to indicate whether to switch the uplink transmission from the first eNB to the second eNB or from the second eNB to the first eNB;
        or, transmitting, by the first eNB or the second eNB, a cell deletion command to the UE;
        or, transmitting, by the first eNB or the second eNB, a cell addition command to the UE;
        or, transmitting, by the first eNB or the second eNB, a cell deletion command and a cell addition command to the UE.

4. A reporting device for reporting a Power Headroom Report (PHR) in dual connectivity, comprising:
    at least one processor; and
    a memory arranged to store instructions executable by the at least one processor,
    wherein the at least one processor is arranged to implement a first split bearer establishment module, a determination module and a reporting module, wherein:
        the first split bearer establishment module is arranged to establish split Data Radio Bearers (DRBs);
        the determination module is arranged to determine change in uplink transmission of the split DRBs, and notify the reporting module of the change in uplink transmission;
        the reporting module is arranged to trigger and report the PHR according to the change in the uplink transmission; and
        the determination module further is arranged to:
            receive uplink transmission switching indication information, and determine to switch the uplink transmission from a first Evolved Node B (eNB) to a second eNB or from the second eNB to the first eNB according to the uplink transmission switching indication information;
            or, receive a cell deletion command, delete a corresponding cell according to the cell deletion command, and switch the uplink transmission from the deleted cell to another cell;
            or, receive a cell addition command, add a corresponding cell according to the cell addition command, and expand the uplink transmission to the added cell;
            or, receive a cell deletion command and a cell addition command transmitted by the first eNB or the second eNB, delete a corresponding cell according to the cell deletion command, add a corresponding cell according to the cell addition command, and switch the uplink transmission from the deleted cell to the added cell.

5. The reporting device according to claim 4, wherein the first split bearer establishment module is further arranged to establish DRBs with a same identifier with the first eNB and the second eNB to make the DRBs exist on both the first eNB and the second eNB to form the split DRBs.

6. A reporting device for reporting a Power Headroom Report (PHR) in dual connectivity, comprising:
    at least one processor; and
    a memory arranged to store instructions executable by the at least one processor,
    wherein the at least one processor is arranged to implement a second split bearer establishment module, a transmission module and a receiving module, wherein:

the second split bearer establishment module is arranged to establish split Data Radio Bearers (DRBs) with a User Equipment (UE);

the transmission module is arranged to transmit an indication for indicating change in uplink transmission to the UE;

the receiving module is arranged to receive the PHR reported by the UE; and the transmission module further is arranged to:
  transmit uplink transmission switching indication information to the UE, the uplink transmission switching indication information being arranged to indicate whether to switch the uplink transmission from a first Evolved Node B (eNB) to a second eNB or from the second eNB to the first eNB;
  or, transmit a cell deletion command to the UE;
  or, transmit a cell addition command to the UE;
  or, transmit a cell deletion command and a cell addition command to the UE.

\* \* \* \* \*